Jan. 3, 1950  M. CALVIN  2,493,654
COBALT BIS-(3-FLUOROSALICYLALDEHYDE)-ETHYLENEDIIMINE
AND METHOD OF MAKING SAME
Filed March 20, 1946  3 Sheets-Sheet 1

INVENTOR.
MELVIN CALVIN
BY
Mellin + Hanscom
ATTORNEYS

Jan. 3, 1950  M. CALVIN  2,493,654
COBALT BIS-(3-FLUOROSALICYLALDEHYDE)-ETHYLENEDIIMINE
AND METHOD OF MAKING SAME
Filed March 20, 1946  3 Sheets-Sheet 3

INVENTOR.
MELVIN CALVIN
BY
Mellin & Hanscom
ATTORNEYS

Patented Jan. 3, 1950

2,493,654

UNITED STATES PATENT OFFICE 2,493,654

COBALT BIS - (3 - FLUOROSALICYLALDE-HYDE)-ETHYLENEDIIMINE AND METHOD OF MAKING SAME

Melvin Calvin, Berkeley, Calif., assignor to The Regents of the University of California, Berkeley, Calif.

Application March 20, 1946, Serial No. 655,875

11 Claims. (Cl. 260—439)

This invention relates in general to a compound capable of absorbing oxygen from the air and which can be made to release its absorbed oxygen by the application of heat so as to be available for various types of industrial purposes.

Specifically, the objects of this invention include: the provision of a new oxygen regenerative compound in the form of an active chelate and which may be designated as active cobalt bis - (3 - fluorosalicylaldehyde)-ethylenediimine; the provision of a new compound which may be designated as 3-fluorosalicylaldehyde and from which the active chelate can be produced; and the provision of an effective method by which the 3-fluorosalicylaldehyde can be converted into the desired active chelate.

Referring to the drawings.

Preparation of 3-fluorosalicylic acid

Figure 1:
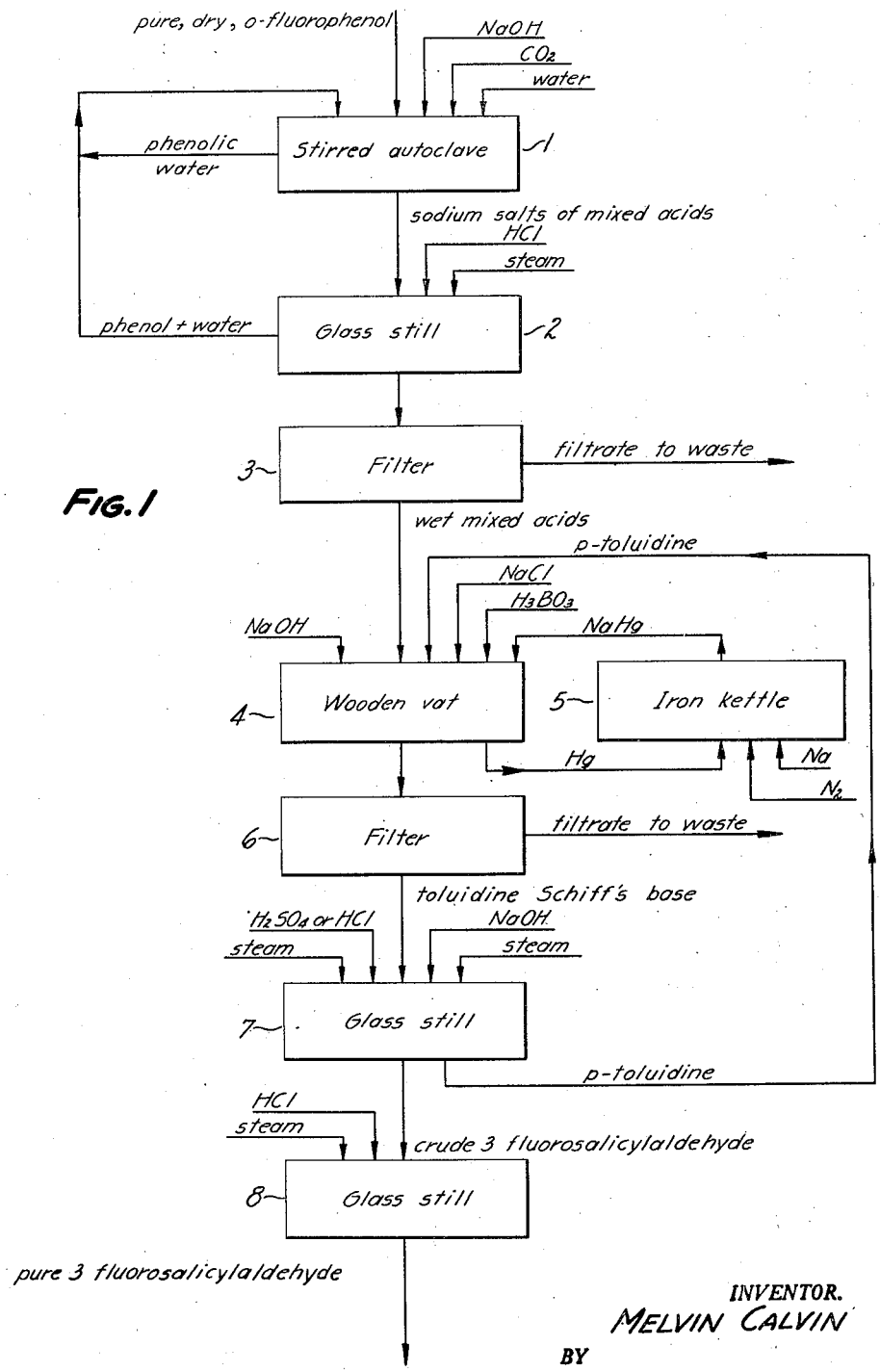
Fig. 1 is a flow diagram illustrating a method for producing 3-fluorosalicylaldehyde from pure, dry, o-fluorophenol.
Figure 3:
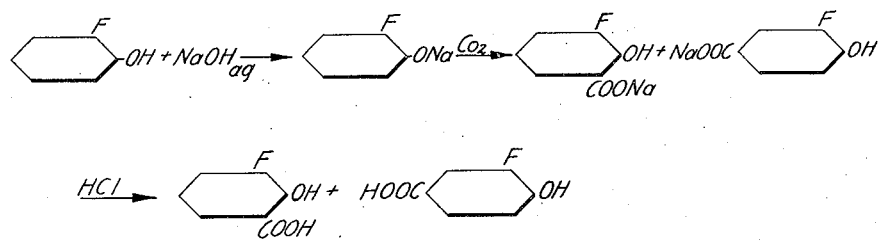
Fig. 3 is a chemical formula illustrating the reactions taking place in the preparation of 3-fluorosalicylic acid from o-fluorophenol by the Kolbe-Schmidt process.
Figure 4:
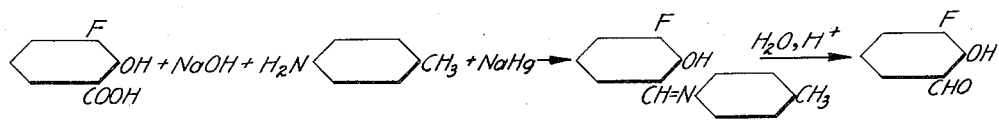
Fig. 4 is a chemical formula illustrating the reactions taking place in the preparation of 3-fluorosalicylaldehyde from 3-fluorosalicylic acid.

As shown in Figures 1 and 3, the first step of my process involves the production of 3-fluorosalicylic acid from o-fluorophenol, a known compound although unavailable commercially at the present time. As indicated in Figure 3, sodium o-fluorophenolate is formed as an intermediate product and 3-fluoro-4 hydroxy benzoic acid is formed as a by product along with the 3-fluorosalicylic acid. In carrying out this step, resort is had to the Kolbe-Schmidt process. Illustrative of the technique involved, 28 lbs. of pure o-fluorophenol (12% in excess of the theoretical amount required) and 9 lbs. of sodium hydroxide dissolved in as little water as possible are mixed in the autoclave 1 and heated therein to produce the dry powdered sodium salt of o-fluorophenol. In doing this the autoclave can be maintained for from 18 to 20 hours at a temperature of 150° C. and under a partial vacuum of about 10 mm. of mercury, although neither of these factors is critical.

The powdered sodium orthofluorophenolate is then cooled in the autoclave to about 120° C. so that it will react properly with the carbon dioxide gas which is subsequently introduced into the autoclave to produce the mixed sodium salts of a 3-fluorosalicylic acid and 3-fluoro-4 hydroxy benzoic acid. It may be found necessary to introduce the $CO_2$ gas alternately from two or more cylinders, for the rapid release of the gas cools the cylinder down to such a low temperature that the required pressure of 700 lbs. cannot be maintained. When this occurs a second cylinder is used while the first one is warming up. The reaction mixture in the autoclave is maintained with stirring at about 130° C. while the phenolate is being carbonated.

The resulting mixed salts of 3-fluorosalicylic acid and 3-fluoro-4-hydroxy benzoic acid are then cooled so as to prevent water from boiling away, and 12.5 gallons of water added. The mix is warmed until substantially all of the salt has gone into solution so that the resulting solution can be readily drained from the autoclave into the still 2.

To the solution contained in the still 2 is added 14 liters of 12 N HCl (50% in excess of the theoretical amount required) and the mix is steam distilled to remove any unreacted o-fluorophenolate, the latter being recirculated to the autoclave as indicated in Fig. 1 along with any phenol distilled from the autoclave.

The residue of mixed acids contained in the still 2 is then crystallized by cooling and recovered by filtering through the filter 3. For convenience, Dry Ice can be used for effecting the required cooling.

Following this the 3-fluorosalicylic acid is reduced to 3-fluorosalicylaldehyde. To this end a sample of the mixed acids is titrated to determine the percentage of the salicylic acid present in the wet mixture. A sufficient quantity of the mix to contain 3 lbs. of the salicylic acid is then added to the vat 4 and dissolved in a solution of 1.2 lbs. of NaOH in 5 gallons of water. The resulting solution is neutralized with 6 N HCl or other mineral acid and diluted with 23 gallons of water. To this are added 7 lbs. of powdered p-toluidine, 49 lbs. of NaCl, and 6 lbs. of boric acid. This mix is then cooled to a temperature of from (12 to 15)° C. It should here be observed that this temperature range is somewhat critical, for an acceptable yield cannot be obtained above or below this range. Furthermore any strong base can be used in place of the sodium hydroxide.

After the mix has been cooled 90 lbs. of NaHg and 18 lbs. of $H_3BO_3$ are added alternately in portions over a period of 1.5 hours or added together at a rate such as to maintain the buffering action of the $H_3BO_3$ and then stirred for another 1.5 hours. The free Hg resulting from the reaction which takes place is drained from the vat 4 and returned to the kettle 5 for making up additional quantities of NaHg as indicated in Fig. 1. This reaction produces toluidine Schiff's base which is recovered by filtration through the filter, the filtrate being drained to waste.

Next the toluidine Schiff's base is decomposed in the still 7 to toluidine sulfate or toluidine chloride by acidification respectively with cold 18 N $H_2SO_4$ or 12 N HCl and steam distilling to remove the resulting crude 3-fluorosalicylaldehyde. The crude distillate may then be re-steam distilled in the still 8, cooled to a temperature of approximately 10° C. to crystallize the pure aldehyde (a new compound) which can then be recovered by filtration.

After the crude aldehyde has been distilled from the still 7, NaOH is added to the residue to break down the toluidine sulfate or chloride into free p-toluidine which can be recovered by steam distillation and returned to the vat 4 for further use.

*Preparation of active cobalt bis-(fluorosalicylaldehyde)-ethylenediimine from 3-fluorosalicylaldehyde*

Figure 2:
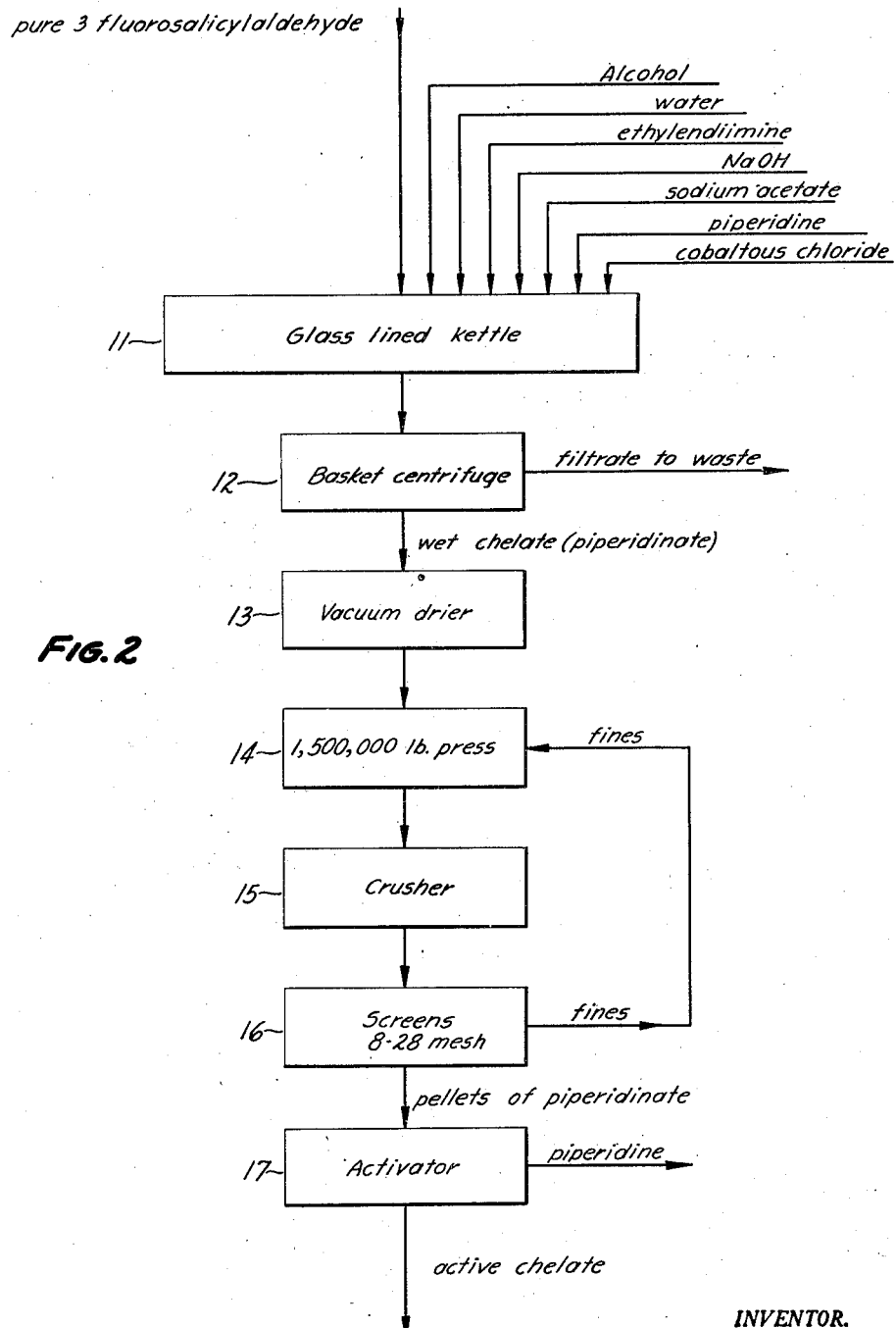
Fig. 2 is a flow diagram illustrating a method of producing the active chelate from 3-fluorosalicylaldehyde.
Figure 5:
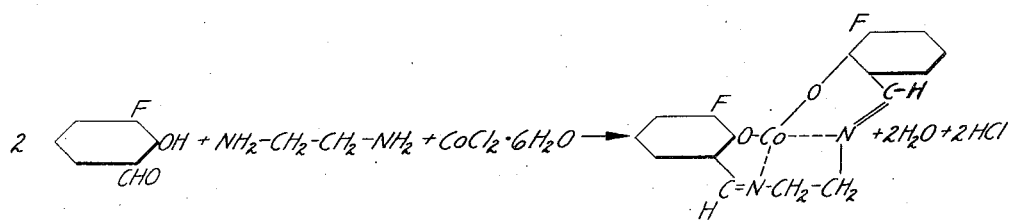
Fig. 5 is a chemical formula illustrating the reactions taking place in the preparation of cobalt bis - (3 - fluorosalicylaldehyde) - ethylenediimine (the active chelate) from 3-fluorosalicylaldehyde.

In the preparation of the active chelate in accordance with the flow diagram illustrated in Fig. 2 and the formula shown in Fig. 5, 1260 grams of the pure aldehyde previously produced are placed in the kettle 11 together with 5 gals. of 95% ethanol and refluxed gently with a slow stream of an inert gas such as nitrogen going through the kettle to remove any oxygen which may be present and to dissolve the aldehyde. Following this are added 504 grams of 68% ethylenediamine with continued refluxing in the presence of nitrogen so as to insure the absence of all oxygen; 2520 grams of sodium acetate trihydrate with refluxing for ten minutes to insure that everything is dissolved; 364 grams of 98% NaOH dissolved in one-half gallon of water; 2520 cc. of 98% piperidine with gentle refluxing and stirring in the presence of nitrogen to insure the absence of oxygen and that everything is dissolved, and finally 1090 grams of cobaltous chloride hexahydrate dissolved in 3 gallons of hot (73° C.) water are added to the resulting solution. Refluxing and stirring in the presence of nitrogen for about 30 minutes is continued to aid in precipitating out the inactive chelate. Following this the contents of the kettle are cooled to about 28° C. so as to avoid oxidation from taking place and to lower the solubility of the solution. It should here be noted that the sodium acetate trihydrate simply serves as a buffering agent and that it can be replaced by any other suitable buffering agent. Likewise the cobaltous chloride can be replaced by any other cobaltous salt, and if desired the piperidine can be replaced by other organic bases.

The chelate is then delivered to the centrifuge 12 where it is washed and partially dried, the filtrate being discarded to waste.

From the centrifuge the partially dried chelate (piperidinate) is transferred to the vacuum drier 13 and dried without the application of heat.

After the drying operation is completed the chelate is subjected to a pressure of about 20,000 lbs. per square inch in the press 14; the pressed chelate is crushed in the crusher 15 and screened in the screen 16 to recover the (8-28) mesh fraction, the fines being returned to the press.

To activate the (8-28) mesh chelate it is spread on trays provided in the activator 17 and heated under vacuum at a temperature of 145° C. for about 2.5 hours so as to remove the piperidine.

It is important to note that cobalt bis-(3-fluorosalicylaldehyde)-ethylenediimine, the chelate here being dealt with, can exist in several different crystalline forms, all having the same chemical composition and all unknown up to the present time. One form has a zero capacity for the absorption of oxygen, and therefore has no use per se as an oxygen regenerator. Still other forms exist which, although having a full rated oxygen absorption capacity, are much slower in their absorption rate than the particular form of the chelate produced in accordance with the method above described. The advantages of the latter form are that it has a relatively high stability and will produce 80 lbs. of oxygen per pound of chelate compound before its productivity is reduced to one-half of its starting value, and it can be made to absorb oxygen at a relatively high rate at an air pressure of less than 30 lbs. per square inch.

The active forms of the chelate and its inactive form are all reddish brown in color although this color differs slightly in shade. However, the active and inactive forms can be definitely identified by resort to X-ray powder photographs. In the two following tables an analysis of the photographs of both types is tabulated.

*Active chelate*

| $λ_s$ | d | I | Remarks |
|---|---|---|---|
| 1.415 | 12.61 | I | |
| 1.746 | 10.25 | F | V. broad. |
| 2.200 | 8.14 | I | |
| 2.462 | 7.27 | F | |
| 2.969 | 6.03 | F | |
| 3.458 | 5.19 | VF | |
| 3.685 | 4.87 | F | |
| 3.789 | 4.74 | F | |
| 4.174 | 4.31 | M | |
| 5.099 | 3.54 | F | |
| 5.239 | 3.45 | S | |
| 5.675 | 3.19 | M | |
| 5.868 | 3.09 | VF | |
| 6.391 | 2.85 | VF | broad. |
| 7.247 | 2.52 | W | |
| 7.352 | 2.48 | W | |
| 7.084 | 2.38 | VVF | Do. |
| 8.243 | 2.23 | W | |
| 8.609 | 2.14 | F+ | |
| 9.098 | 2.03 | VF | |
| 9.308 | 1.99 | VF | |
| 9.849 | 1.89 | F | |
| 11.246 | 1.68 | F | |

*Inactive chelate*

| d | I | |
|---|---|---|
| 10.19 | VVF | |
| 9.19 | S+ | |
| 7.94 | S++ | |
| 7.47 | VW | |
| 6.25 | W | Broad. |
| 5.26 | W | V. broad. |
| 4.14 | F | |
| 3.93 | M | |
| 3.81 | F | |
| 3.42 | S | |
| 2.89 | F | |
| 2.82 | M− | |

In both tables $\Delta_5$ is the diameter in centimeters of the diffraction halo, corrected to correspond to a camera of 5 cm. radius; $d$ is the Bragg spacing in Angstrom units; and I is the intensity. Under the I column I designates intense; S designates strong; M, moderate; W, weak; F, faint; and V, very. It will therefore be seen that I, S, M, W and F respectively indicate progressively diminishing intensities in a qualitative manner. VF for example indicates very faint, and VVF, very, very faint.

To serve as an oxygen regenerative compound the active chelate should be in the form of pellets or granules of from 8 to 28 mesh so that air can be readily passed through a body of the compound.

I claim:

1. The chelate: cobalt bis-(3-fluorosalicylaldehyde)-ethylenediimine.

2. The active chelate: cobalt bis-(3-fluorosalicylaldehyde)-ethylenediimine characterized by the following Bragg spacings in Angstrom units: 12.61, 10.25, 8.14, 7.27, 6.03, 5.19, 4.87, 4.74, 4.31, 3.54, 3.45, 3.19, 3.09, 2.85, 2.52, 2.48, 2.38, 2.23, 2.14, 2.03, 1.99, 1.89, 1.68.

3. A method of preparing cobalt bis-(3-fluorosalicylaldehyde)-ethylenediimine from 3-fluorosalicylaldehyde comprising: refluxing the aldehyde in an oxygen-free atmosphere with an alcohol, ethylenediamine, a buffering agent, an organic base and a cobaltous salt.

4. A method of preparing cobalt bis-(3-fluorosalicylaldehyde)-ethylenediimine from 3-fluorosalicylaldehyde comprising: refluxing the aldehyde in an oxygen-free atmosphere with an alcohol, ethylenediamine, sodium acetate trihydrate, sodium hydroxide, piperidine and cobaltous chloride.

5. A method of preparing active cobalt bis-(3-fluorosalicylaldehyde)-ethylenediimine from 3-fluorosalicylaldehyde comprising: refluxing the aldehyde in an oxygen-free atmosphere with an alcohol, ethylenediamine, a buffering agent, an organic base and a cobaltous salt to produce an inactive chelate; and then heating the inactive chelate under a partial vacuum to remove any organic base which may be present and to activate the chelate.

6. A method of preparing active cobalt bis-(3-fluorosalicylaldehyde)-ethylenediimine from 3-fluorosalicylaldehyde comprising: refluxing the aldehyde in an oxygen-free atmosphere with an alcohol, ethylenediamine, sodium acetate trihydrate, sodium hydroxide, piperidine and cobaltous chloride to produce the inactive chelate; and then heating the inactive chelate under a partial vacuum at about 145° C. to remove any piperidine which may be present and to activate the chelate.

7. A method of producing cobalt bis-(3-fluorosalicylaldehyde)-ethylenediimine comprising: reducing 3-fluorosalicylic acid to 3-fluorosalicylaldehyde and then refluxing the aldehyde in an oxygen-free atmosphere with an alcohol, ethylenediamine, a buffering agent, an organic base and a cobaltous salt.

8. A method of producing cobalt bis-(3-fluorosalicylaldehyde)-ethylenediimine comprising: reducing 3-fluorosalicylic acid to 3-fluorosalicylaldehyde and then refluxing the aldehyde in an oxygen-free atmosphere with an alcohol, ethylenediamine, a buffering agent, a strong mineral base, an organic base and a cobaltous salt.

9. A method of producing cobalt bis-(3-fluorosalicylaldehyde)-ethylenediimine comprising: reducing 3-fluorosalicylic acid to 3-fluorosalicylaldehyde and then refluxing the aldehyde in an oxygen-free atmosphere with an alcohol, ethylenediamine, sodium acetate trihydrate, sodium hydroxide, piperidine and cobaltous chloride.

10. A method of producing active cobalt bis-(3-fluorosalicylaldehyde)-ethylenediimine comprising: reducing 3-fluorosalicylic acid to 3-fluorosalicylaldehyde; refluxing the aldehyde in an oxygen-free atmosphere with an alcohol, ethylenediamine, a buffering agent, an organic base and a cobaltous salt to produce the inactive chelate; and then heating the inactive chelate in a partial vacuum to remove any organic base which may be present and to activate the chelate.

11. A method of producing active cobalt bis-(3-fluorosalicylaldehyde)-ethylenediimine comprising: reducing 3-fluorosalicylic acid to 3-fluorosalicylaldehyde; refluxing the aldehyde in an oxygen-free atmosphere with an alcohol, ethylenediamine, sodium acetate trihydrate, sodium hydroxide, piperidine and cobaltous chloride to produce the inactive chelate; and then heating the inactive chelate in a partial vacuum at about 145° C. to remove any piperidine which may be present and to activate the chelate.

MELVIN CALVIN.

REFERENCES CITED

The following references are of record in the file of this patent:

UNITED STATES PATENTS

| Number | Name | Date |
|---|---|---|
| 2,139,471 | Schmidt | Dec. 6, 1938 |
| 2,345,485 | Krzikalla | Mar. 28, 1944 |
| 2,352,462 | Weiss et al. | June 27, 1944 |
| 2,355,257 | Badertscher | Aug. 8, 1944 |
| 2,450,276 | Fogler et al. | Sept. 28, 1948 |

OTHER REFERENCES

Berichte, vol. 41, page 4147, Weil.

Jour. Prakt. Chemie, vol. 129 (1931), pages 163–168, Pfeiffer et al.

Leibig's Annalen der Chem., vol. 503, pages 91–101, Pfeiffer et al.

Chem. Soc., Japan (Bull.), vol. 13, No. 2 (1938), pages 252–260 and pages 580–591, Tsumaki.